United States Patent [19]

Semon

[11] Patent Number: 4,758,004
[45] Date of Patent: Jul. 19, 1988

[54] CASKET SEALING GASKET HAVING SEALING RIDGES OF DIFFERENT HEIGHTS

[75] Inventor: Joseph F. Semon, Eynon, Pa.

[73] Assignee: Casket Shells, Inc., Eynon, Pa.

[21] Appl. No.: 914,242

[22] Filed: Oct. 2, 1986

[51] Int. Cl.⁴ .................. F16J 15/10; A61G 17/02
[52] U.S. Cl. .......................... 277/207 R; 277/12; 27/17
[58] Field of Search .............. 277/207 R, 208, 211, 277/12, 32; 27/17

[56] References Cited

U.S. PATENT DOCUMENTS

| 2,661,229 | 12/1953 | Slaught | 277/211 |
| 2,773,366 | 12/1956 | Slaght | 277/207 R X |
| 3,327,429 | 6/1967 | Slaughter | 27/17 X |
| 4,555,119 | 11/1985 | Semon | 277/207 R |

FOREIGN PATENT DOCUMENTS

| 278085 | 9/1967 | Australia | 277/207 A |
| 648434 | 1/1951 | United Kingdom | 277/211 |

Primary Examiner—Robert S. Ward
Attorney, Agent, or Firm—Kane, Dalsimer, Sullivan, Kurucz, Levy, Eisele and Richard

[57] ABSTRACT

A casket gasket wherein sealing is provided by a plurality of pointed and rounded contact points disposed on a plurality of deformable sealing ridges disposed within joints between the casket lid and body.

8 Claims, 5 Drawing Sheets

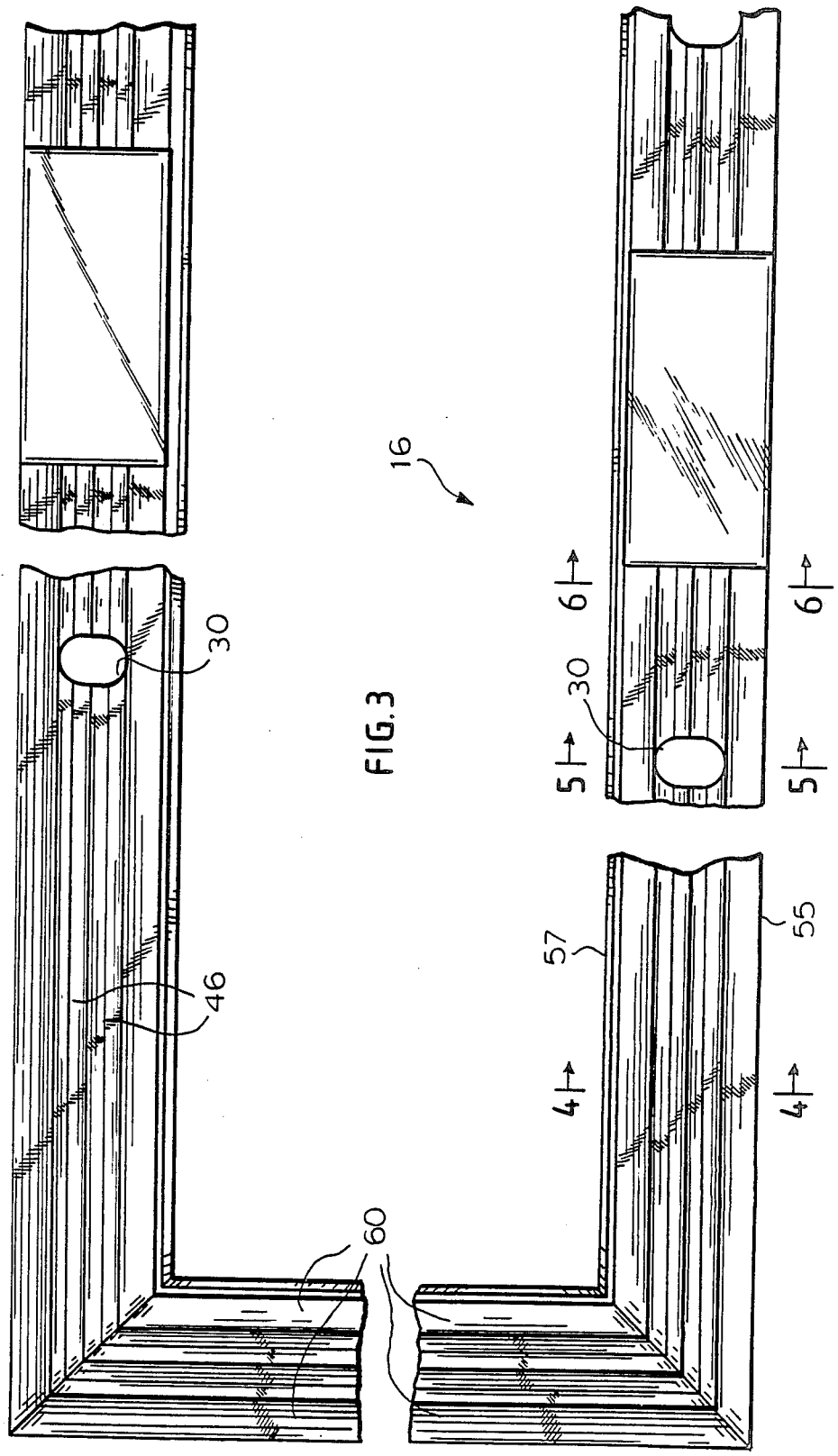

CASKET SEALING GASKET HAVING SEALING RIDGES OF DIFFERENT HEIGHTS

REFERENCE TO RELATED PATENT

This application discloses a casket sealing gasket of the type disclosed in commonly assigned U.S Pat. No. 4,555,119 issued Nov. 26, 1985.

BACKGROUND OF THE INVENTION

The above-referenced patent, incorporated herein by reference, shows a casket sealing gasket wherein sealing is provided by a plurality of contacts disposed on a plurality of concave deformable sealing ridges disposed within joints between the casket lid and its body.

OBJECT AND SUMMARY OF THE INVENTION

It is an object of the present invention to provide an improved reliable and efficient casket seal that is easily installed during manufacture of conventional caskets.

It is a further object of this invention to provide a casket sealing gasket that readily deforms to accommodate surface irregularities and obstructions commonly encountered in the joint formed between a casket body and its lid, and between sections of two-piece lids known as a header joint.

A further object of the present invention is to provide a casket sealing gasket particularly adapted to provide a continuous seal in joint areas interrupted by e.g. hardware associated with the alignment and locking of casket lids and pad areas where header joints intersect the joint between a casket body and its lid.

A further object of the present invention is to provide a sealing gasket that will make a proper seal even when slightly creased, when the casket lid is slightly misaligned or upon repeated opening and closing of the casket.

Since experience has shown that the most minute opening in a seam in the bottom of a steel casket allows significant amounts of fluids to leak and interfere with preservation of the body, another object of the invention is to provide a casket sealing gasket which will prevent any such leakage from the casket assembly.

With the above and other incidental objects in view as will more fully appear in the description below, the invention intended to be protected by Letters Patent consists of the features of construction, the parts and combinations thereof, and the mode of operation as hereinafter described or illustrated in the accompanying drawings or their equivalents.

BRIEF DESCRIPTION OF THE DRAWINGS

Referring to the accompanying drawings wherein the same reference characters refer to the same or like parts and a preferred embodiment is shown:

FIG. 3 is a partial detailed top plan view of a casket sealing gasket representing a segment of the casket sealing gasket shown in FIG. 2;

DETAILED DESCRIPTION OF THE PREFERRED EMBODIMENT

Figure 1:
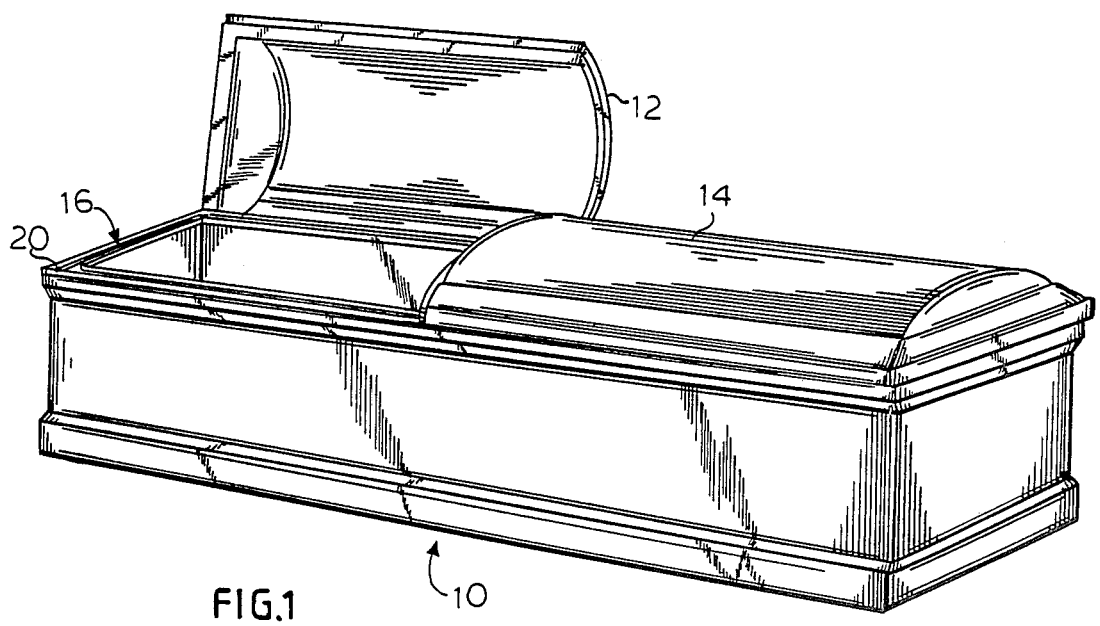
FIG. 1 is a perspective view of a conventional perfection casket.
Figure 4:
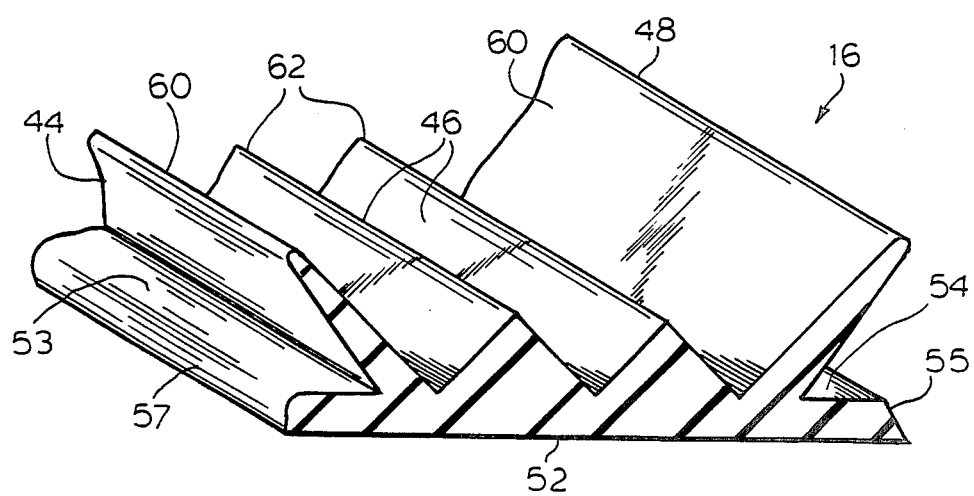
FIG. 4 is a cross-sectional view of FIG. 3 shown along line 4—4 of FIG. 3.
Figure 2:
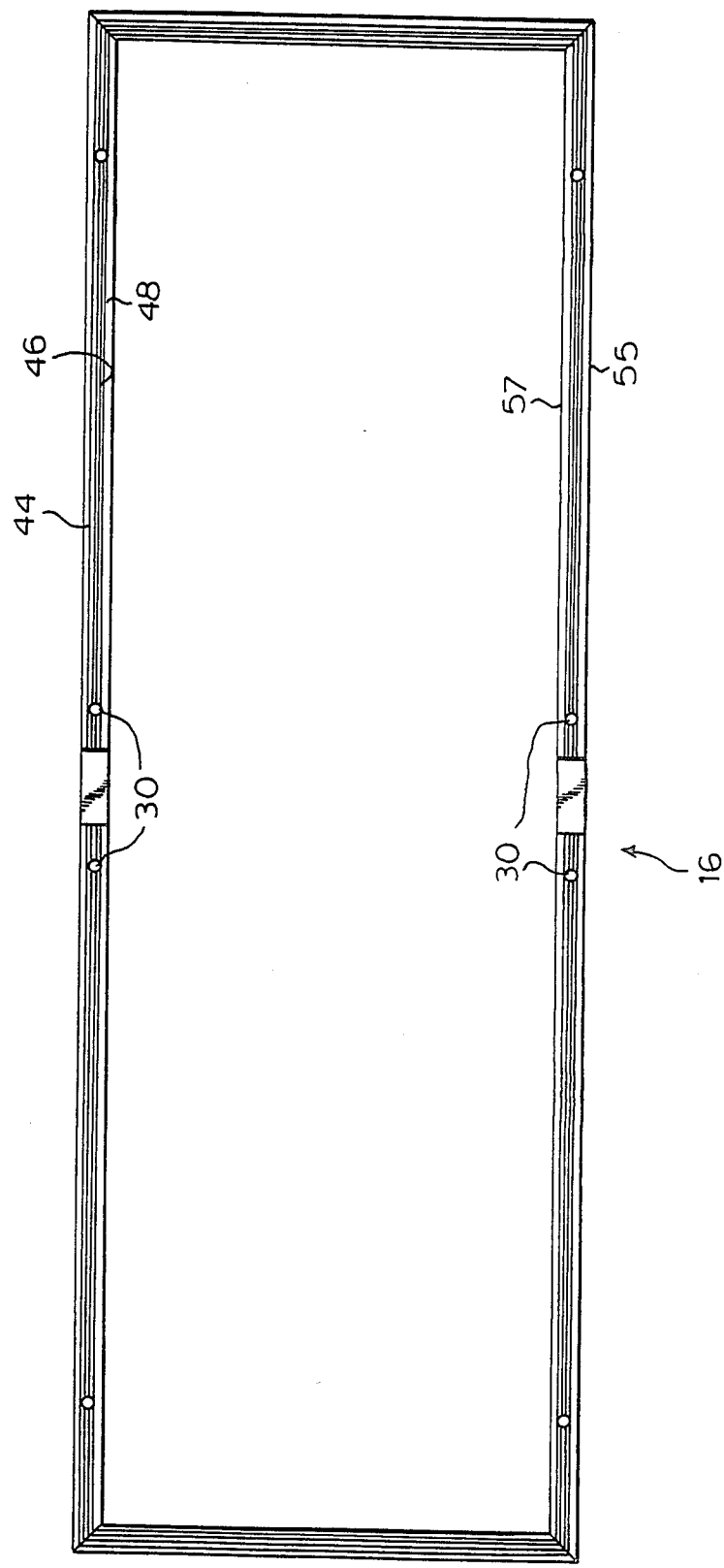
FIG. 2 is a top plan view of a casket sealing gasket constructed in accordance with this invention.

Referring more specifically now to FIG. 1, a conventional casket 10 has open lid section 12 and a closed lid section 14, a casket sealing gasket 16, hereinafter described in detail is sealably affixed along the casket body ledge 18 of casket 10, so that when lid sections 12 and/or 14 are closed the sealing gasket 16 is compressed and thereby deformed to accommodate irregularities in the surface of the lid rail section 20, forming a continuously sealed joint about the entire casket 10 periphery, between the casket body ledge 18 and its lid rail 20. FIG. 2 details the common positioning of hardware for casket lid hinges 30 and strike holes 32, required for proper fastening and alignment of the lid sections 12 and 14. The hinge holes 30 of this embodiment do not intersect any of the sealing ridges 44, 46 and 48, hereinafter described. They are provided for by a preformed hole through the sealing gasket 16, at appropriate places adjacent to but not intersecting with the massive ridge body 52, hereinafter described.

The strike holes 32 do intersect the massive ridge portion 52 of the sealing gasket 16 and hence obstruct the otherwise straight path of the seal 28 formed between the casket body ledge 18 and lids 12 and 14.

In caskets of the kind shown herein, having two-piece lids, another obstruction to the path of the seal 28 occurs where the header joint 22 between the upper and lower lid sections 12 and 14, respectively, meet the sealing gasket 16. The lower lid 14 is provided with a lip 24, which fits beneath recess 26 in upper lid 12 when the casket is closed. Lip 24 provides a seat for header gasket 25 which is compressed and deformed by recess 26, when the upper lid 12 is closed forming a seal between the lid sections.

Details of the sealing gasket 16 are shown in FIG. 3, oval through holes 30 for lid hinges are positioned to register with corresponding hinge holes in casket body ledge 18, when the sealing casket 16 is put into place during manufacture of the casket body 10. Likewise, round through holes 32 are provided in sealing gasket 16 to permit locking members (not shown) to pass from the lid or lid sections 12 and 14 into strike holes in casket body ledge 18, through sealing gasket 16. The periphery of sealing gasket 16 is provided with outer ridge 48, intermediate ridges 46 and inner ridge 44. The inner ridge 44 is intersected by through holes 32 but not by through holes 30.

The ridges 44 and 48, each arranged atop of body 52 are provided with a rounded or convex peak structure 60. The peak 60 of the ridges 44, 48 is slightly elevated (approximately 0.025 in.) with respect to the peak of ridges 46, because it is compressed between the stiffest portions of the body ledge 18 and lid rail 20. Consequently, when the upper and lower casket lids 12 and 14, respectively, are closed onto the casket body ledge 18 as in FIG. 6, contact is made with the outer ridges 44 and 48, deforming them, permitting contact with the intermediate ridges 46, which are subsequently deformed, but obviously to a lesser extent than ridges 44 and 48, because of the difference in height. As a result, the casket body ledge 18 and lid rails 20 are not deformed by the elastic deformation forces of the intermediate and inner ridges 44 and 46 to the point that the sealing features of the casket are overridden.

In pad areas 34, FIG. 2, where the header joint 22 intersects the gasket body 16, when the casket is closed, perforations 70 are provided in the underside of the gasket body 16. These perforations 70 give the pad areas 34 a softer more yielding nature to ensure proper sealing in this area.

The corners of the illustrated gasket 16 are provided with square trim sections. However, as disclosed in the referenced patent, the same gasket design is adaptable to use with either square or oval caskets.

Figure 5:
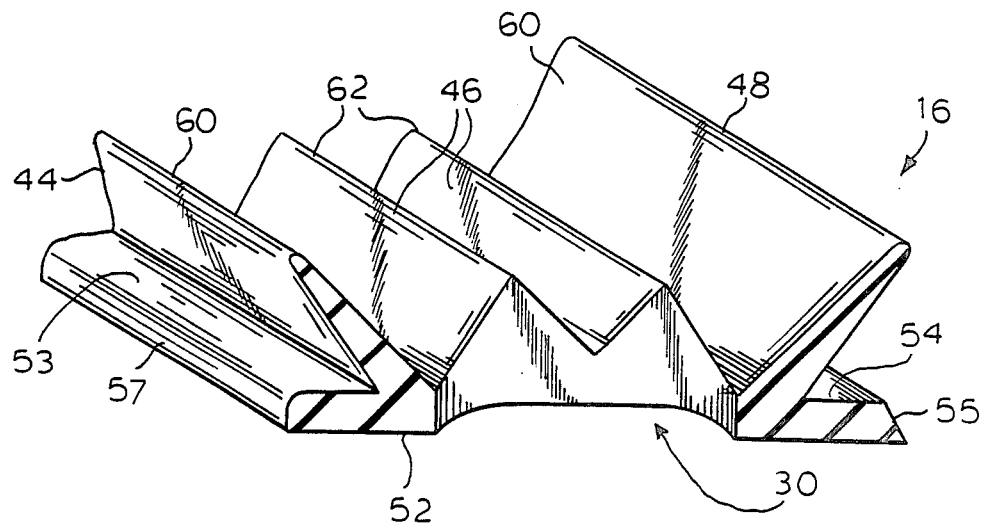
FIG. 5 is a cross-sectional view of FIG. 3 shown along line 5–5.
Figure 6:
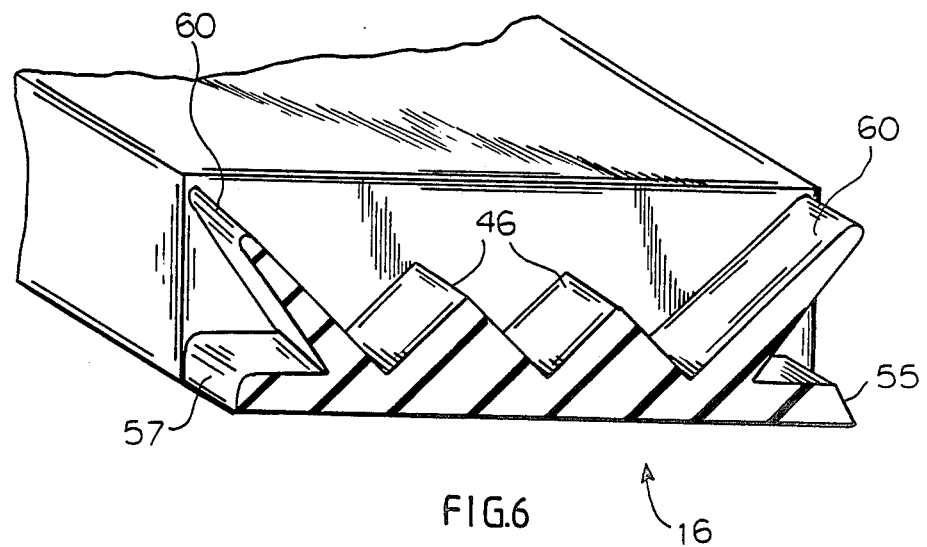
FIG. 6 is a cross-sectional view of FIG. 3 shown along line 6—6 showing the gasket non-compressed.
Figure 7:
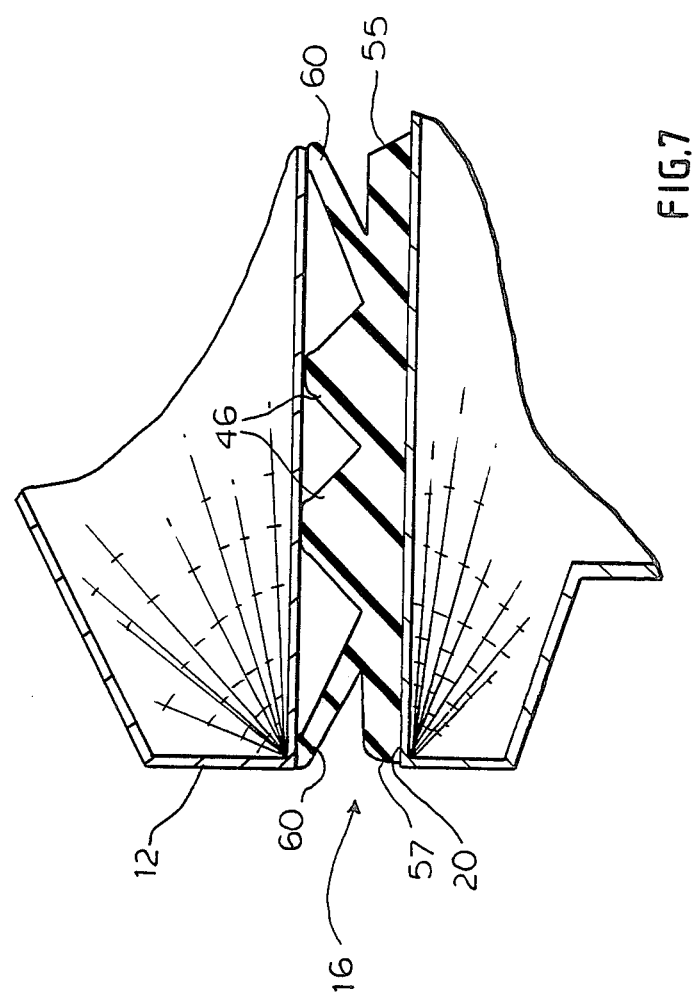
FIG. 7 is a sectional view of FIG. 6 showing the gasket in compressed condition.

The peak structures 60 of the intermediate ridges 46 each have a pointed structure providing two contact points 62 with the lid sections 12 and 14. As shown in FIGS. 5, 6, and 7 the height of intermediate ridges 46 is about half of that or ridges 44 and 48 which are of the same height. Ridges 46 have a substantially pyramidal shape when uncompressed. The ridges 44 and 48 tapered toward their rounded contact points or upper extremities. Ridges 44 and 48 form a substantially acute angle with respect to the base 52 which has a substantially flat pair of end sections 53 and 54 which at one end has a flared out portion 55 and at the other end a rounded portion 57.

The gasket 16 is constructed of soft vulcanized durometer rubber in one unitized piece to avoid unnecessary seams that could interfere with proper sealing. The gasket body 16 may be provided with a shimmed effect created by gradual thickening toward its corners to compensate for surface irregularities resulting from the grinding of the welds commonly used to secure casket corners.

While the above language specifically describes the best contemplated mode of the present invention in compliance with applicable statutes, it is not intended to limit the invention to the specific features shown, rather it is but one of several modes of putting the invention into practice, an therefore the invention is claimed in any of its forms of modifications within the legitimate and valid scope of any of the appended claims.

What is claimed is:

1. An improved casket sealing gasket which comprises;
    a gasket body of deformable material adapted to form a continuous seal within the joint defined by a casket body and its lid;
    a plurality of sealing ridges of different height atop the gasket body, said sealing ridges disposed parallel to the gasket body periphery;
    contact points formed by said sealing ridges uppermost surface; and
    the uppermost surface of at least one sealing ridge being rounded at its top and at least one being pointed at its top to form substantially parallel contact points, the sealing ridges closest to the gasket body peripheries being taller than other sealing ridges.

2. A casket sealing gasket as recited in claim 1, wherein there are two outermost peripheral sealing ridges having rounded tops.

3. A casket sealing gasket as recited in claim 2, wherein there are two intermediate pyramidal sealing ridges having pointed tops.

4. A casket sealing gasket as recited in claim 3 wherein the two intermediate sealing ridges are pyramidal.

5. A casket sealing gasket as recited in claim 3, wherein the two pointed sealing ridges are of the same height.

6. A casket sealing gasket as recited in claim 2, wherein the two latter sealing ridges are of approximately the same height.

7. A casket sealing gasket as recited in claim 1 wherein the outermost seling gasket sealing ridges being approximately 0.025" taller than the innermost sealing ridges.

8. A casket sealing gasket as recited in claim 1 wherein the sealing ridges closest to the gasket body periphery are flared outwardly at an acute angle with the gasket body so that they flex outwardly when deformed by the casket lid.

* * * * *